June 21, 1932.  C. BERG ET AL  1,863,710
COFFEE MACHINE
Filed June 10, 1930
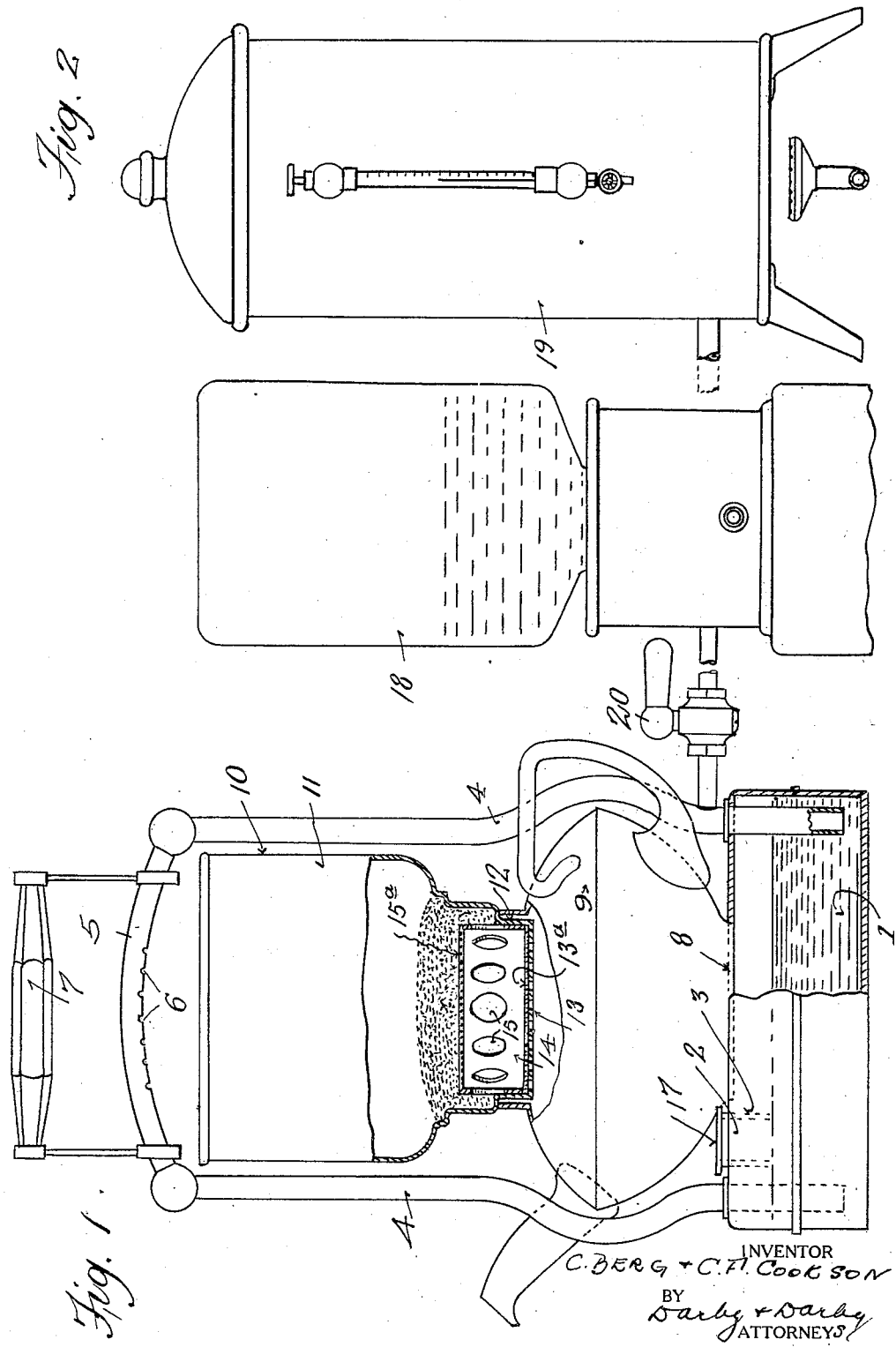
INVENTOR
C. BERG + C. F. COOKSON
BY
Darby + Darby
ATTORNEYS Patented June 21, 1932

1,863,710

UNITED STATES PATENT OFFICE

CHARLES BERG, OF NEW YORK, N. Y., AND CLARENCE F. COOKSON, OF LYNDHURST, NEW JERSEY, ASSIGNORS TO COUNTER COOKING MACHINE CORPORATION, OF NEW YORK, N. Y., A CORPORATION OF DELAWARE

COFFEE MACHINE

Application filed June 10, 1930. Serial No. 460,136.

The object of our invention is a coffee machine for the making of drip coffee, which is practically automatic in operation and which enables the repeated making of coffee under exactly the same conditions and with exactly the same results.

A further object is a coffee machine in which no water can reach the ground coffee until it is at substantially boiling temperature, in which the water is caused to fall upon the ground coffee at a progressively increasing rate whereby the strength of the extraction is maintained at substantially uniform value throughout the process and in which the coffee distillation cannot boil.

The machine of our invention is also so designed that the correct amount of water for each distillation may be obtained without measurement, and in connection therewith we provide means whereby faucet water or spring water, either hot or cold, may be supplied to the machine by simply turning the valve.

Our machine also permits of practically continuous operation since the coffee pot and filter chamber are separate from the water supply, which makes it possible to keep the machine in continuous operation simply by replacing one pot and filter chamber by another.

A form of our machine which we have selected for purposes of description is illustrated by the accompanying drawing, in which Figure 1 is a side elevation partly in section illustrating the complete machine; and Fig. 2 are side elevations illustrative of cold and hot water supplies which may be connected to the machine.

In Figure 1, there is shown a water boiler 1 having in the top thereof an opening 2, the edge of which is in the form of a depending flange 3. The lower edge of flange 3 is terminated at such a height above the bottom of the boiler that it lies in the same horizontal plane as the surface of the water when the boiler has been filled with that quantity of water necessary for a single operation of the machine. It will be obvious that no more water than this can be admitted to the boiler since there is no other opening above the water line through which air can escape. Consequently, if the water has risen to the level of the bottom edge of flange 3 it cannot rise higher save through the opening 2, which will result simply in an overflow of the boiler. By this means the proper quantity of water may be admitted to the boiler without measurement and yet a definite quantity insured, and in addition an air space above the water is left in which the steam which constitutes the motive power may accumulate.

Projecting into the boiler through its top are pipes 4 preferably two in number, the lower ends of which terminate just above the bottom of the boiler. The upper ends of these pipes are connected together by a pipe 5 which is preferably somewhat arched as shown. The center section of pipe 5 is perforated in its lower surface with a number of small apertures 6 symmetrically disposed with respect to the vertical axis of the machine. Pipe 5 also serves as a convenient support for a handle 7 by means of which the entire machine may be lifted and carried.

The top 8 of boiler 1 serves as a base for the coffee pot proper. For convenience in positioning the pot, a slight depression, corresponding in size and shape to the bottom of the pot, may be formed in the top of the boiler.

The coffee pot proper and the filter chamber resemble in general form the ordinary drip coffee machine. That is to say, the pot 9 is a simple coffee pot of any desired shape, size and design having an opening in the top suitable to receive the lower end of the filter chamber 10. The pot and filter chamber are so positioned as to be directly below the perforations 6 in pipe 5. The filter chamber 10 while conforming to usual practice in general outline differs in detail. It includes an enlarged portion 11 and a constricted portion 12 of suitable size to fit easily into the neck of the coffee pot. The bottom 13 of the filter chamber is perforated as usual and adapted to receive thereon a filter 13ª of rice paper, cloth or other suitable material. This filter is held in place by a novel construction in the form of an inverted cup 14, the lower edge of which rests upon the filter and holds it in position. The sides of inverted cup 14 are perforated by a series of relatively large openings 15 extending entirely around the circumference thereof, and the top is composed of wire screen 15a of fine mesh, say 100 to 150 to the inch.

If desired, the cup 14 may be reversed and the filter 13a omitted, in which case the fine mesh screen 15a now resting upon the bottom 13 of the filter chamber, performs the function of a filter with the great advantage that it is indestructible as compared with the extremely fragile paper ordinarily employed.

The machine operates as follows:—If filter 13a is to be used, it is placed upon the bottom 13 of filter chamber 10 and fixed in position by the insertion of cup 14. The required amount of ground coffee is then distributed over the screen top of cup 14 and in the space between the cup and the walls of the filter chamber as shown in Fig. 1. Then the filter chamber is placed in position on top of the coffee pot and the pot set upon the top of boiler 1.

Water is then admitted to the boiler either from the regular water supply, from a spring water container 18 or a hot water boiler 19, as shown in Fig. 2, or by pouring through opening 2 until the water level in the boiler has risen to the bottom of flange 3 of opening 2. Opening 2 is then closed by a suitable stopper 17 and heat applied to the bottom of the boiler. When the water boils it will be forced upward through pipes 4 at a progressively increasing rate and into both ends of pipe 5 from which it will escape through perforations 6 and drip upon the ground coffee below. At first, very little water will rise through pipes 4 so that it will first escape through the openings 6 which are furthest from the center of pipe 5 and, consequently, lowest because of the arched shape of the pipe. As the action increases more and more water will escape through opening 6 and fall upon the coffee. Thus, a means is provided whereby at first a limited amount of water will be brought into contact with the ground coffee, thus limiting the amount of initial extraction and will progressively increase as the action goes on. In this way the strength of extraction is maintained much more uniformly than with the ordinary drip coffee pot in which the entire quantity of water is poured upon the ground coffee at one time. In other coffee pots the initial extraction is exceedingly strong and gets weaker and weaker as the process progresses. It is preferable, in order to secure coffee of finest quality, to maintain the rate of extraction as uniform as possible, and this we are able to do by our method.

As has already been stated, the ground coffee is initially distributed above the top of inverted cup 14 so that none of it is in contact with strainer 13a. However, the water dripping from perforations 6 strikes the ground coffee with considerable impact and gradually propels it through openings 15 onto the surface of filter 13a. In this way the coffee is progressively transferred from the outside to the inside of cup 14 and is thus brought into contact with the water much more gradually than in the ordinary drip coffee machine. When the operation is progressed to the point that the level of the water in the boiler has been lowered to the bottom of pipes 4 the machine will stop working and the pot and filter chamber may be replaced by another, the boiler refilled with water and the process repeated again without delay. A single machine may, therefore, be employed with any number of pots. There is no danger that the boiler will be burnt out since a certain amount of water always remains therein below the lower ends of pipes 4. As we have already indicated, the water supply may be either hot or cold and from any desired source. Time will be saved, however, if the water is preheated in a suitable tank 19, such as that shown in Fig. 2 which, as we have said, may be directly connected to the boiler through a suitable valve 20.

If it is desired to dispense with filter 13a, cup 14 may be reversed as heretofore described so that the fine mesh screen 15a rests upon the bottom of the filter chamber. The ground coffee may then be placed upon the top of the screen which now acts as the filter. In this arrangement the water falls directly upon the coffee as it rests upon the filter, and the coffee is not transferred from the outside to the inside of cup 14 as in the other form. Otherwise, the operation is the same. Thus the possibility of converting the screen 13a into a filter is of great practical utility, even when the practice is to use a filter paper since it insures against interruption of service through exhaustion of the supply of filters.

By our invention we secure a coffee making machine by which a predetermined quantity of water may be progressively brought in contact with a measured amount of coffee in such a way that the strength of distillation will be substantially uniform throughout the process. We also insure by our device the absolutely essential requirement to perfect coffee, that the water shall be a few degrees below the boiling point when it strikes the coffee. In our machine the coffee making process starts automatically when the water in the boiler reaches the boiling point and stops automatically when the proper quantity of water has been projected upon the ground coffee, the supply of boiling water and coffee beverage are never intermingled, the coffee beverage cannot be caused to boil and substantially continuous operation is made possible.

What we desire to secure by Letters Patent is:

1. A drip coffee pot comprising a lower receptacle for coffee extract, an upper receptacle for ground coffee and water, communicating through a perforated bottom with said lower receptacle, a cup having a bottom pierced with perforations small enough to act as a filter and sides having holes large enough to permit the passage of ground coffee therethrough, said cup being invertible and fitting into said upper receptacle above the perforated bottom thereof so that in bottom down position it acts as a filter and in bottom up position maintains the ground coffee in spaced relation to the perforated bottom of the upper receptacle at the beginning of the coffee making process but permits of the gradual deposition of said ground coffee on a filter placed directly above the perforated bottom of the upper receptacle as the process progresses.

2. A drip coffee machine comprising a boiler, means for introducing water thereinto, means for automatically limiting the quantity of water which may be introduced thereinto to less than its maximum capacity, means associated with said boiler whereby the water therein may be discharged from an elevated point, a drip coffee pot beneath said discharge point according to claim 1.

3. A drip coffee machine comprising a boiler, a discharge outlet sealed therein and extending upwardly from a point relatively near the bottom, a drip coffee pot beneath the upper end of said discharge outlet according to claim 1.

In testimony whereof we have hereunto set our hands on this 6th day of June A. D. 1930.

CHARLES BERG.
CLARENCE F. COOKSON.